United States Patent [19]

Abbott et al.

[11] Patent Number: 4,528,017
[45] Date of Patent: Jul. 9, 1985

[54] BLANK CYLINDER APPARATUS

[75] Inventors: Vaughan Abbott, North Granby; Bruce R. Beckwith, Unionville; Charles M. Kingsbury, Manchester; John P. Mungovan, Simsbury, all of Conn.; Elden H. Mills, Windham, Vt.

[73] Assignee: Emhart Industries, Inc., Farmington, Conn.

[21] Appl. No.: 472,365

[22] Filed: Mar. 4, 1983

[51] Int. Cl.³ ............................................. C03B 9/40
[52] U.S. Cl. ......................................... 65/240; 65/305; 65/307
[58] Field of Search ................... 65/307, 305, 240; 92/85 B; 91/409, 216 R

[56] References Cited

U.S. PATENT DOCUMENTS

| | | | |
|---|---|---|---|
| 1,050,287 | 1/1913 | Olson | 91/409 |
| 2,366,777 | 1/1945 | Farley et al. | 91/409 |
| 2,396,787 | 3/1946 | Hawthorne et al. | 91/409 |
| 2,757,484 | 8/1956 | Winder | 65/305 |
| 3,477,841 | 11/1969 | Fouse | 65/307 |
| 4,339,264 | 7/1982 | Dahms | 65/240 |

Primary Examiner—S. Leon Bashore
Assistant Examiner—Michael K. Boyer
Attorney, Agent, or Firm—H. Samuel Kieser

[57] ABSTRACT

An improved blank cylinder mechanism for a glassware making machine which utilizes shims between the bottom plate and support in conjunction with the cam track to adjust the angular position of the cylinder in down position. Also, the blank cylinder mechanism uses a double tapered slot in the piston rod to provide cushioning.

3 Claims, 12 Drawing Figures

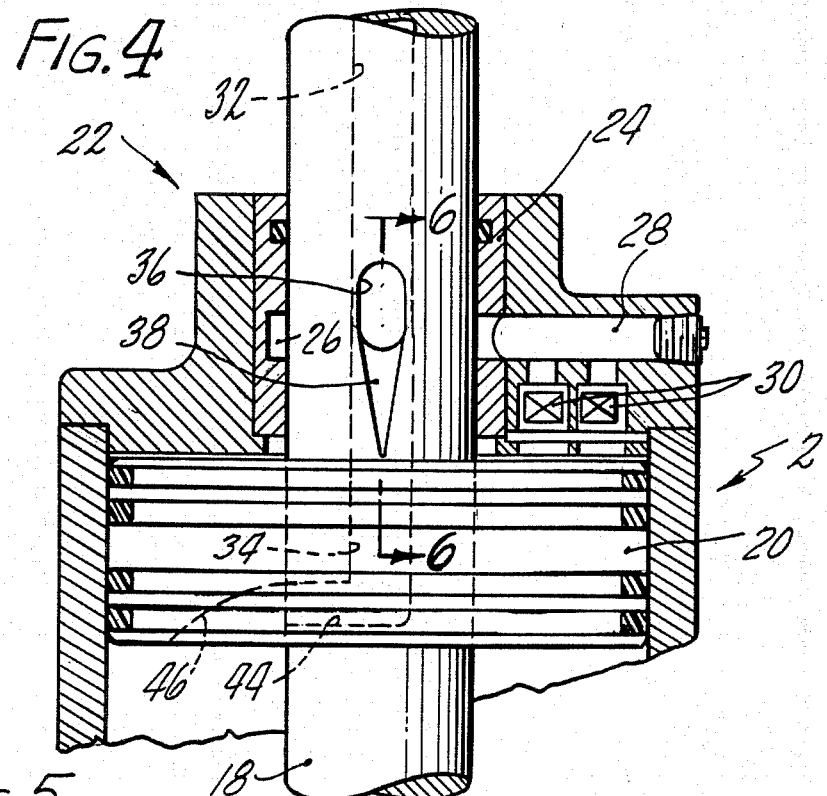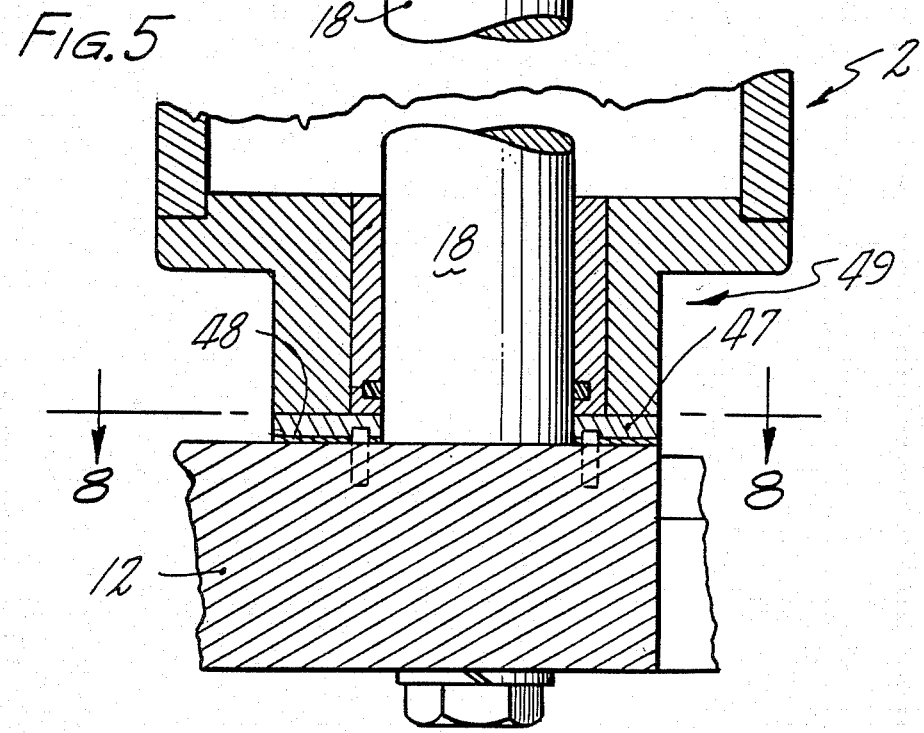

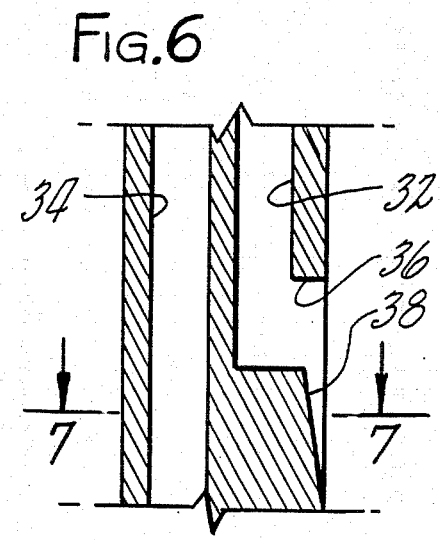
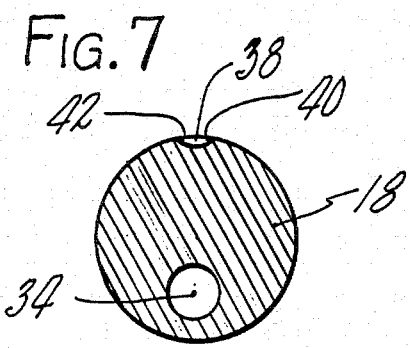
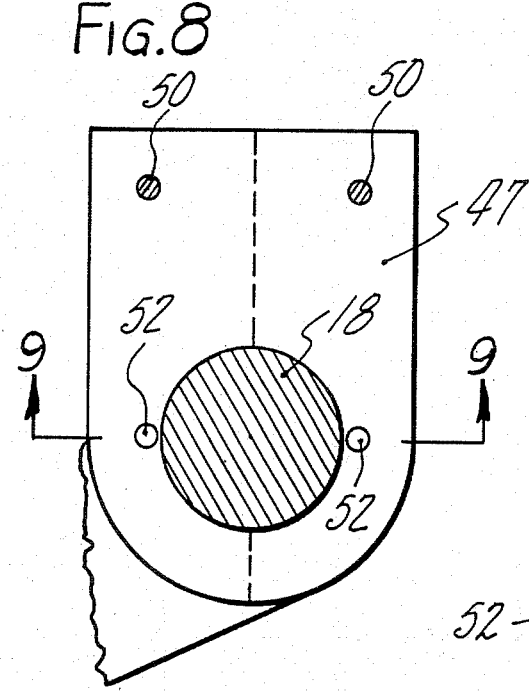
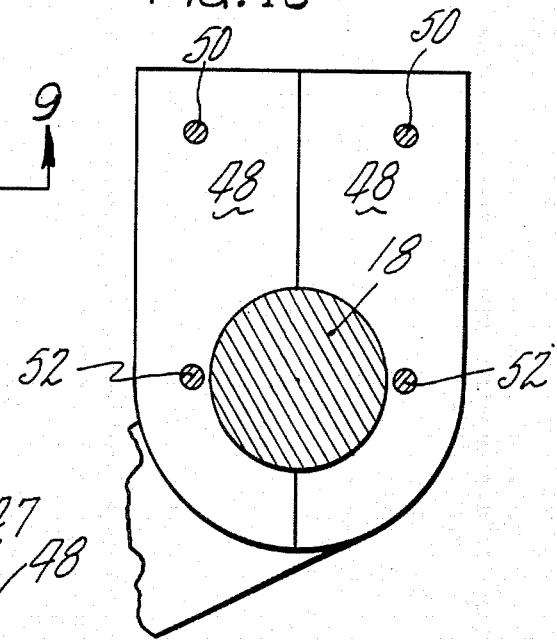
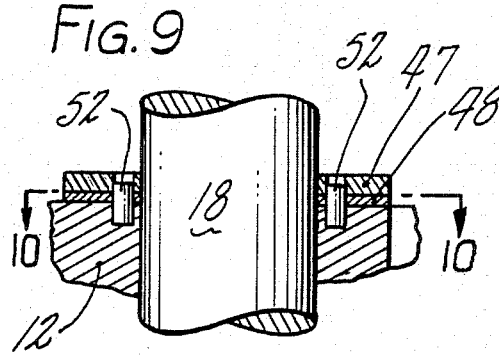

BLANK CYLINDER APPARATUS

BACKGROUND OF THE INVENTION

This invention relates generally to an improved blank cylinder apparatus. More particularly, this invention relates to an improved blank cylinder apparatus for use with a glass forming machine of the press and blow type which is a single table, continuous rotary motion machine having a plurality of individual forming units mounted for rotation about the axis of the machine. This type of machine is generally shown in U.S. Pat. No. 1,979,211 which issued on Oct. 30, 1934 to G. E. Rowe. Machines of this type are commonly used in the glass industry today and are known as the "Emhart H-28 Machine." The type of machine shown in the 1,979,211 patent is a single gob machine. That is, at each forming unit, only one piece of ware is produced during a single cycle of each forming unit.

An improved version of this machine is disclosed in U.S. Pat. No. 4,339,264 issued to Francis A. Dahms on July 13, 1982, which patent is hereby incorporated by reference in this disclosure in its entirety. This type of machine shown in the patent is a double gob machine. That is, it forms two articles of ware during one cycle of each given forming unit. The apparatus shown in the 4,339,264 patent utilizes a blank cylinder mechanism in which a cylinder to which the blank molds are connected are raised during the period of operation of the machine when the glass gob is pressed and then returned to their lower position. The motion involved in raising and lowering of the blank cylinder involves both a vertical movement and a horizontal movement. In order for a machine to run efficiently, it is necessary for the blank cylinder to be able to raise the blank molds into the pressing position in the shortest period of time and then return the blank molds to their lower position for further processing of the parison or preform formed during the pressing operation.

SUMMARY OF THE INVENTION

In view of the above, it is an object of the present invention to provide an improved blank cylinder mechanism.

It is a further object of the present invention to provide an improved blank cylinder mechanism which will permit an increase in speed of raising the blank molds into position for the pressing operation and then returning the blank cylinder to its lower position.

Another object of the present invention is the provision of a blank cylinder mechanism having a cam design which reduces wear caused by acceleration.

It is yet another object of the present invention to provide a blank cylinder mechanism having improved cushioning means for the cylinder.

Still another object of the present invention is the provision of an improved blank cylinder having adjustment means to control the location of the blank molds in their delivery position.

DESCRIPTION OF THE DRAWINGS

FIG. 4 is an enlarged cross sectional view of the upper portion of the piston and cylinder apparatus of the blank cylinder mechanism constructed in accordance with the present invention.

FIG. 5 is an enlarged cross sectional view of the lower portion of the piston and cylinder apparatus of the blank cylinder mechanism constructed in accordance with the present invention.

FIG. 6 is a cross sectional view of the piston rod taken along the line 6—6 of FIG. 4.

FIG. 7 is a cross sectional view taken along the lines 7—7 of FIG. 6.

FIG. 8 is a sectional view taken along the lines 8—8 of FIG. 5.

FIG. 9 is a section view taken along the lines 9—9 of FIG. 8.

FIG. 10 is a sectional view taken along the line 10—10 of FIG. 9.

DETAILED DESCRIPTION

Figure 1:
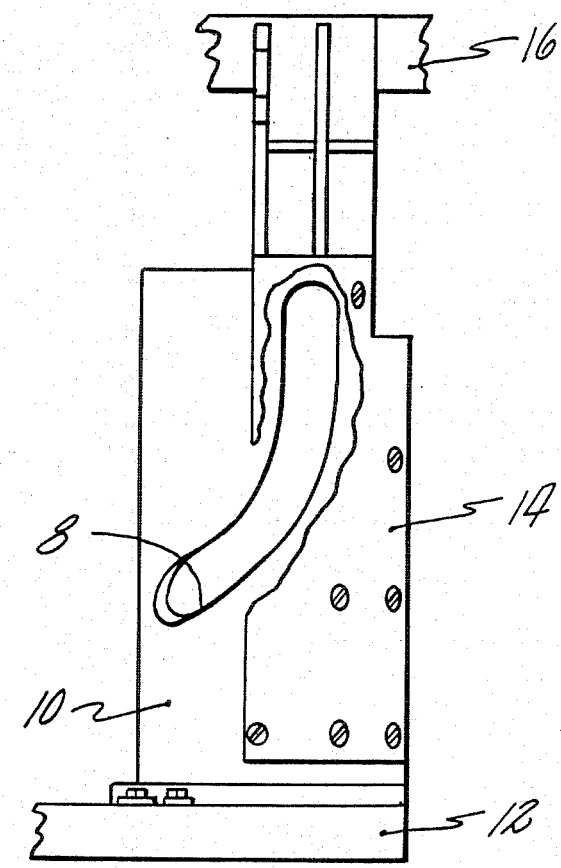
FIG. 1 is a side view, partially broken away, of the blank cylinder mechanism of the present invention with the cam roller omitted for the purposes of clarity.
Figure 2:
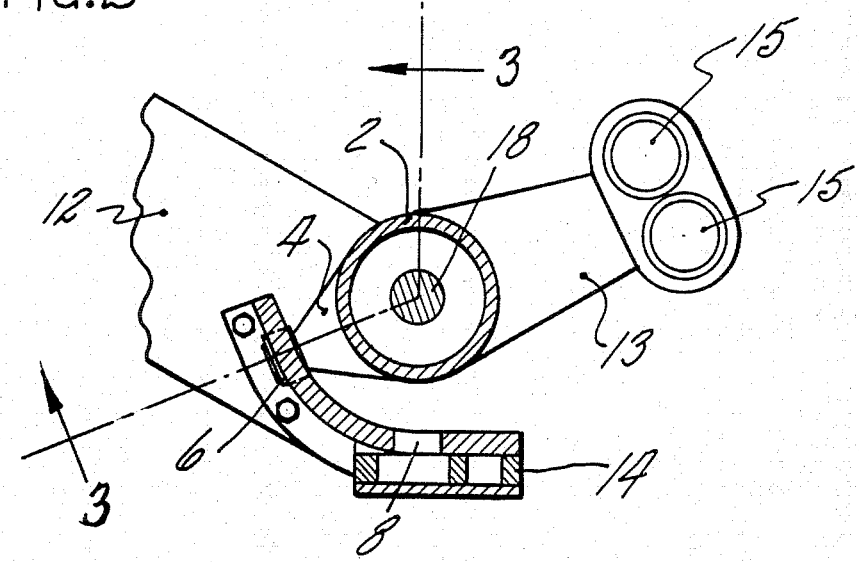
FIG. 2 is a sectional view taken along the lines 2—2 of FIG. 1.
Figure 3:
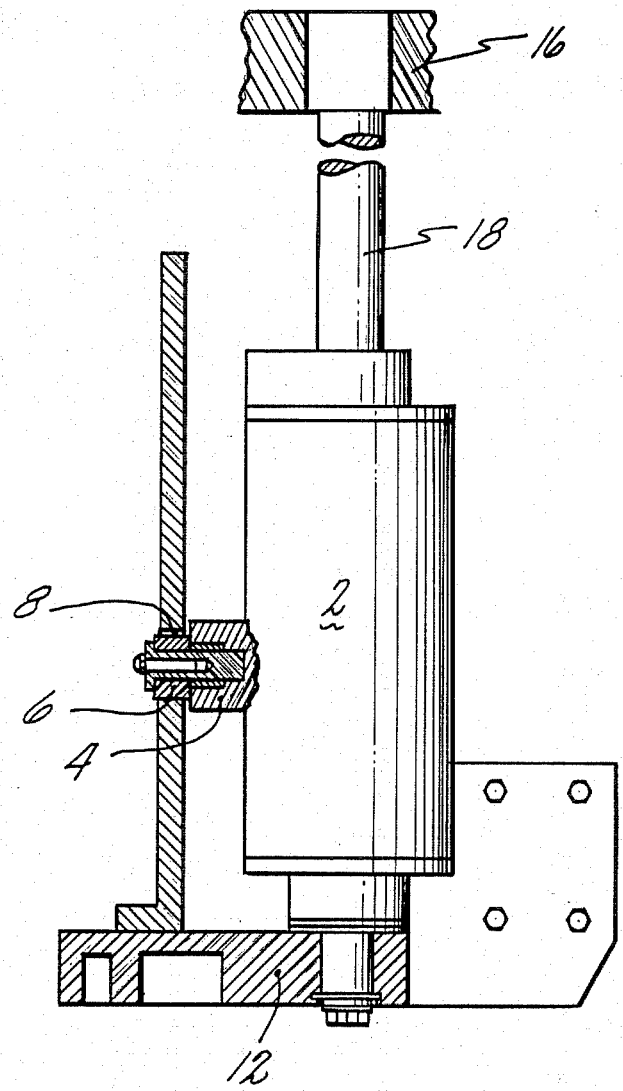
FIG. 3 is a partial sectional view taken along the lines 3—3 of FIG. 2.

Referring to FIGS. 1 and 2, a blank cylinder 2 includes a cam arm 4 which extends outwardly therefrom terminating in a cam roller 6 which extends into a cam track 8 in cam plate 10 which is mounted on a bracket member 12. A blank mold arm 13 is attached to and extends from the cylinder and contains the blank molds 15 as more fully described in U.S. Pat. No. 4,339,264. Attached to the cam plate 8 is a mounting plate 14 which is attached to the cam plate 10 at its lower end and a neck ring support arm 16 of the machine at its upper end.

The blank cylinder 2 is mounted on a piston rod 18 which has its lower end secured to the bracket member 12 and its upper end secured to the neck ring support arm 16. A piston member 20 is mounted on the piston rod 18.

Referring now to FIGS. 4 and 5, the upper portion of the blank cylinder 2 includes a cylinder head 22 having a bushing 24 therein which includes a circular chamber 26 which communicates with a passage 28 in the cylinder head containing a plurality of check valves 30 which open into the interior of the cylinder 2 at the top of the piston member 20. The check valves 30 are so constructed that they will permit air from chamber 26 to flow into the interior of the cylinder 2 into the top of the piston but will prevent air from passing in the other direction.

The operating air for the blank cylinder 2 is provided through conduits 32 and 34 within the piston rod 18. The air conduit 32, to raise a cylinder with respect to the piston, is shown particularly in FIGS. 4, 6 and 7. The conduit 32 includes a horizontal port 36 which, when the cylinder is in its down position, communicates with the circular chamber 26. Extending downwardly from the main port 36 is a double tapered slot 38 as particularly shown in FIGS. 5 and 7 the end portion of which terminates at approximately the upper portion of the piston member when the cylinder is in its downward position, as will be noted, the slot 38 tapers downward from its greatest depth to its lesser depth and has its sides 40 and 42 tapering inwardly.

Return air is provided through the conduit 34 in the piston rod 18 which exits through a horizontal port 44 which communicates with slot 46 in the bottom of the piston member 20 whereby air may be fed to the interior of the cylinder at the bottom of the piston member 18.

The operation of the mechanism is such that when the cylinder 2 is in its down position, air passes through conduit 32, through port 36, through passageway 28, through check valves 30 and enters the interior of the cylinder at the top of piston member 20 causing the cylinder 2 to raise. When the bushing 24 passes the port 36 and slot 38, air is directly fed into the interior of the cylinder 2 from the port 36 rather than through passageway 28. During the upper movement of the cylinder 2, air at the bottom of the piston member 26 is exhausted through port 44 and conduit 34. After the cylinder has reached its upper most position and it is desired to lower it, air is passed through conduit 34 and port 44 to the bottom of the piston member 26 causing the cylinder 2 to move downwardly. Air trapped at the top of the piston member 26 exits through port 36 and conduit 32. As the cylinder begins to reach the bottom of its downward stroke, the bushing 24 begins to cover the port 36 and slot 38 resulting in a reduction of the area from which air can be exhausted. This provides a cushioning for the downward stroke of the cylinder 2.

Referring now to FIGS. 5 and 8–10, an adjustment is provided for insuring the proper angular relationship of each of the blank molds in the delivery position. For this purpose, a bottom plate 47 is provided against which the lower head 49 of the cylinder 2 abuts. The bottom plate 2 is spaced from the bracket member 12 by means of a split shim member 48. Two screws 50 extend through the rear of the bottom plate 47 and shim member 48 and are threaded into bracket member 12 and hold the bottom plate and shim on the bracket member. Two locating dowels 52 are provided at the front of the bottom plate 47 and shim 48 extending upwardly from the bracket member 12.

To change the position of the blank molds 15 additional shim members 48 may be added or removed which will raise or lower the bottom position of the blank cylinder 2. Due to the shape of the cam track 8, as the cylinder 2 moves vertically, it also rotates thereby changing the angular position of the blank mold arm 13. While in normal set up procedure of the machine, each forming unit has one split shim 48 provided underneath the bottom plate 47, the thickness of and the number of the shims may be varied to insure the proper positioning of the blank molds 15.

Figure 11:
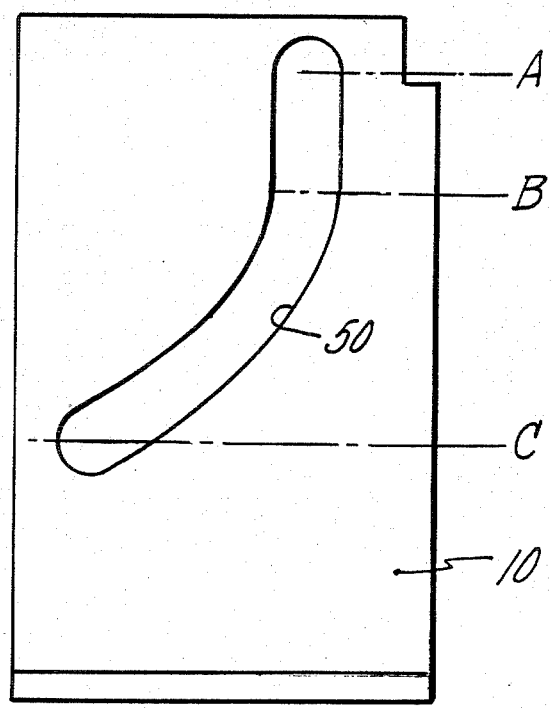
FIG. 11 is a developed view of the length of the cam used in accordance with the present invention.
Figure 12:
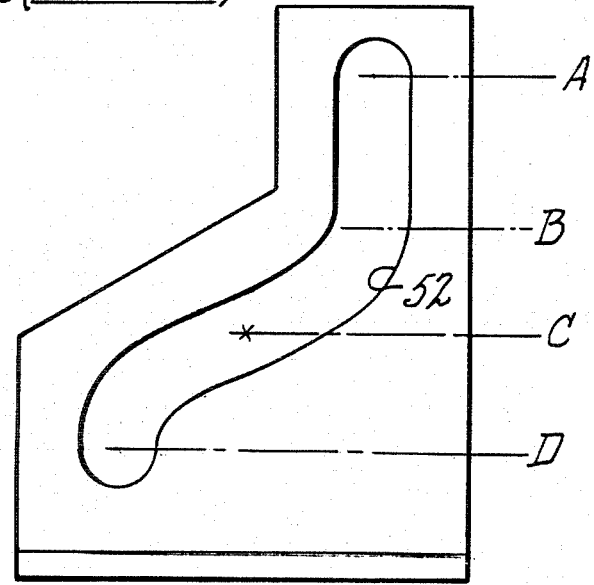
FIG. 12 is a developed view of the length of the cam used according to the prior art in connection with the machine shown in U.S. Pat. No. 4,339,264.

Referring now to FIGS. 11 and 12, a developed cam profile is shown for cam track used for the present invention (FIG. 11) and that previously used in the machine shown in U.S. Pat. No. 4,339,264 (FIG. 12). It will be seen that the cam profile 50 of the cam track 8 in cam plate 10 according to the present invention is basically J-shaped while the cam profile 52 used with the prior art as shown in U.S. Pat. No. 4,339,264 has a generally S-shaped configuration. In more detail the cam profile 50 of cam track 8 according to FIG. 11 is such that from points A to B the cam track is vertical and there is a straight downward motion of the cylinder 2. From points B to C the cam profile has an increasing radius around an axis to the left of and above the line indicated by B in FIG. 11. On the other hand in accordance with the prior art, as depicted in FIG. 12, the cam profile 2 includes a straight portion between the lines A and B but includes a radius in one direction between the lines B and C around one general axis and a radius from C to D opposite thereto. Such cam has been generally referred to as an S cam.

More particularly, the cam track profile as shown in FIG. 11 is such that as the blank cylinder moves downwardly, its rotational movement has generally a constant acceleration. Such a cam profile is can be, but is not limited to a normal trapozoid acceleration curve.

While reference has been made above to specific embodiments, it will be apparent to those skilled in the art that various modifications and alterations may be made thereto without departing from the apirit of the present invention. Therefore, it is intended that the scope of this invention be ascertained be reference to the following claims.

What is claimed is:

1. In a glassware forming machine, a blank cylinder mechanism for moving at least one blank mold connected thereto, said mechanism comprising a piston rod, a piston member mounted on said piston rod, a cylinder mounted on said piston member and moveable with respect thereto, a cam follower arm extending outwardly from said cylinder terminating in a cam follower, a cam track plate having a cam track therein, said cam follower being positioned in said cam track, an air conduit in said piston rod including an outlet port, said cylinder having a head portion having a chamber therein which communicates with the outlet port when said piston is adjacent said head portion, a passageway in said head portion extending from said chamber to said interior of the cylinder, check valve means in said passageway, said check valve means permitting air to flow from said chamber to the interior of said cylinder, but preventing flow from the interior through said passage to the chamber, and a double tapered slot in said piston rod extending from said exit port to said piston, said slot having its deepest position adjacent said outlet port.

2. In a glassware forming machine, a blank cylinder mechanism for moving at least one blank mold connected thereto, said mechanism comprising a support member, a piston rod mounted on said support member, a piston mounted on said piston rod, a cylinder mounted on said piston member and movable with respect thereto, an arcuate cam track plate mounted on said support member and having a cam track therein, a cam follower arm extending from said cylinder and terminating in a cam follower positioned in said cam track, said cam track having an upper portion which is substantially vertical and a lower portion connected to said upper portion which imparts rotation to the cylinder as the cylinder moves vertically, a bottom plate mounted on said support member about said piston rod to form a stop for the downward movement of said cylinder, and at least one removable shim member positioned between said bottom plate and said support member, said shim in combination with the cam track and cam follower causing said cylinder rotate about its vertical axis when a shim is added or withdrawn.

3. In the glassware forming machine of claim 2, each said shim member being split.

* * * * *

UNITED STATES PATENT AND TRADEMARK OFFICE
CERTIFICATE OF CORRECTION

PATENT NO. : 4,528,017

DATED : July 9, 1985

INVENTOR(S) : Vaughan Abbott, Bruce R. Beckwith, Charles M. Kingsbu: John P. Mungovan, Elden H. Mills It is certified that error appears in the above-identified patent and that said Letters Patent is hereby corrected as shown below:

Col. 4, line 15 - "apirit" should read --spirit--
Col. 4, line 61 - before the word "rotate" insert the word --to--

Signed and Sealed this

First Day of October 1985

[SEAL]

Attest:

Attesting Officer

DONALD J. QUIGG

Commissioner of Patents and Trademarks—Designate